(12) United States Patent
Lemsitzer et al.

(10) Patent No.: US 10,762,311 B2
(45) Date of Patent: Sep. 1, 2020

(54) METHOD FOR RFID TAG AUTHENTICATION

(71) Applicant: NXP B.V., Eindhoven (NL)

(72) Inventors: Stefan Lemsitzer, Stainz (AT); Marc Vauclair, Overijse (BE)

(73) Assignee: NXP B.V., Eindhoven (NL)

( * ) Notice: Subject to any disclaimer, the term of this patent is extended or adjusted under 35 U.S.C. 154(b) by 0 days.

(21) Appl. No.: 16/260,320

(22) Filed: Jan. 29, 2019

(65) Prior Publication Data

US 2020/0242313 A1    Jul. 30, 2020

(51) Int. Cl.
*G06Q 30/00*       (2012.01)
*G06K 7/10*        (2006.01)
*G06K 19/07*       (2006.01)

(52) U.S. Cl.
CPC ..... *G06K 7/10366* (2013.01); *G06K 19/0723* (2013.01)

(58) Field of Classification Search
CPC ....... G06Q 10/087; G06Q 10/08; G06Q 10/06
USPC ......................................................... 235/385
See application file for complete search history.

(56) References Cited

U.S. PATENT DOCUMENTS

| 10,523,443 | B1* | 12/2019 | Kleinman | H04L 9/3252 |
| 10,554,405 | B1* | 2/2020 | Endress | H04L 63/12 |
| 2018/0174097 | A1 | 6/2018 | Liu et al. | |
| 2018/0189528 | A1 | 7/2018 | Hanis et al. | |
| 2019/0080284 | A1* | 3/2019 | Kim | G06Q 10/0833 |
| 2019/0392159 | A1* | 12/2019 | Wojcik | G06F 21/62 |
| 2020/0021569 | A1* | 1/2020 | Simons | H04L 63/08 |

FOREIGN PATENT DOCUMENTS

CN      108053001 A    5/2018

OTHER PUBLICATIONS

Deloitte; Continuous Interconnected Supply Chain; Using Blockchain & Internet-of-Things in Supply Chain Traceability.
Faizod; "Supply Chain With Blockchain Showcase RFID;" Downloaded from Internet Dec. 11, 2018 https://faizod.com/supply-chain-with-blockchain-showcase-rfid/.
Hatkinson-Kent, Luke; 2018 RFID Journal; RFID and Blockchain Are Changing Supply Chains; Internet: http://www.rfidjournal.com/articles/view?17464.
Johny, Snehal et al.; "Integration of RFID, NYC and Blockchain Technologies;" Int'l Journal of Innovative Research in Computer and Communication Engineering; vol. 5, Iss. 5, May 2017; www.ijircce.com; DOI: 10.15680/IJIRCCE.2017.0505095.
Roman, Lauren, TransparentPlanet; "Blockchain + RFID = Total Product Lifecycle Management" RAIN RFID Alliance Meeting, Seattle, WA, Jul. 20, 2017.

(Continued)

*Primary Examiner* — Ahshik Kim
(74) *Attorney, Agent, or Firm* — Daniel D. Hill

(57) ABSTRACT

A method is provided for authenticating a device in a system having a blockchain. The method includes executing a one-side authentication of the device. The results of the one-side authentication are submitted to the blockchain at a first blockchain node of a plurality of blockchain nodes. The one-side authentication is later verified at a second blockchain node of the plurality of blockchain nodes. The device may be a tag in a radio frequency identification (RFID) system.

20 Claims, 4 Drawing Sheets

(56) References Cited

OTHER PUBLICATIONS

Secure Technology Alliance, A Secure Technology Alliance Payments Council White Paper; "Blockchain and Smart Card Technology;" Version 1.0, Mar. 2017.
Westerkamp, Martin et al.; "Blockchain-based Supply Chain Traceability: Token Recipes Model Manufacturing Processes;" 2018 IEEE International Conference on Blockchain, Piscataway, NJ; DOI: 10.1109/Cybermatics_2018.2018.00267.

* cited by examiner

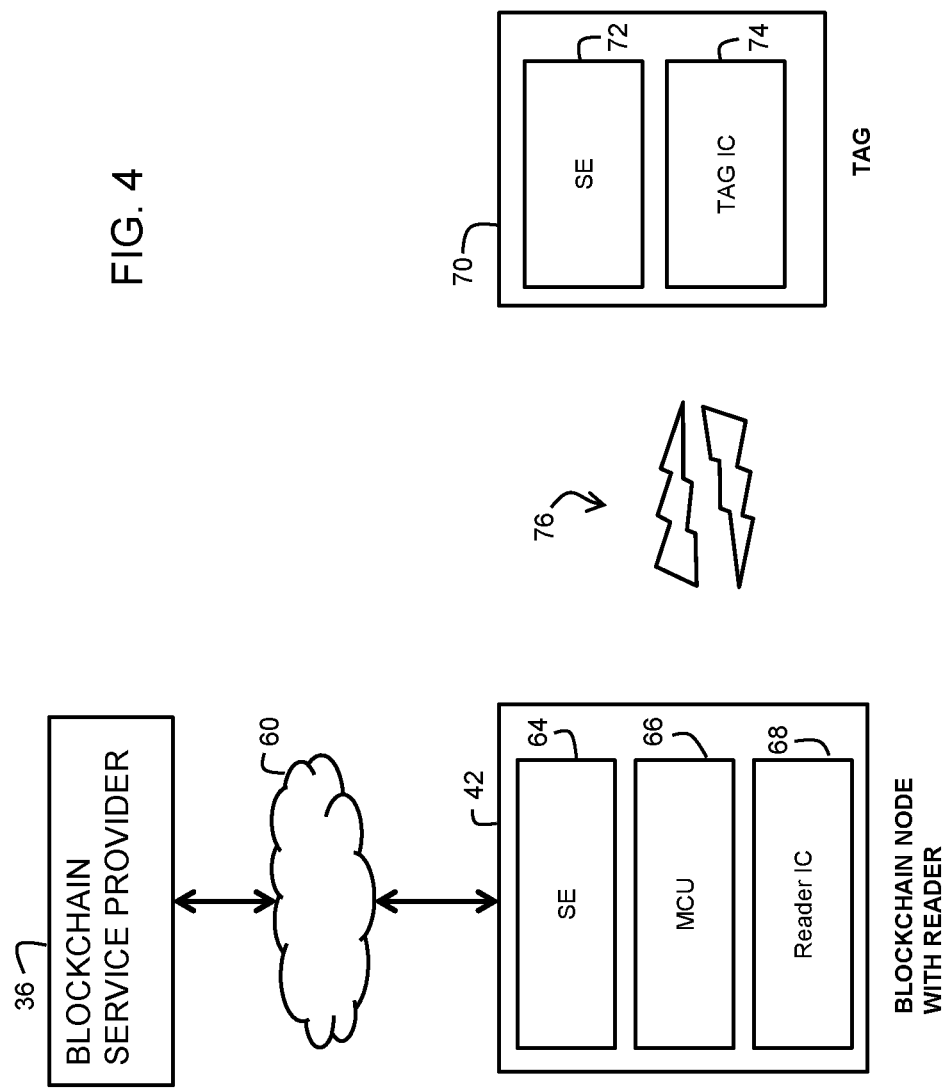

METHOD FOR RFID TAG AUTHENTICATION

BACKGROUND

Field

This disclosure relates generally to security, and more particularly to a method for RFID TAG authentication.

Related Art

Radio frequency identification (RFID) is used to provide item level tagging in various applications such as supply chain management, manufacturing, asset management, retail, library, and inventory control. The use of RFID helps to provide a high level of automatization to many applications.

Security and privacy are becoming increasingly important in a connected RFID system. In an RFID system, data is transmitted wirelessly between a portable device called a tag and a tag reader. The transmitted data can include sensitive information that may be intercepted and exploited by an attacker. Tagged devices can be cloned and injected into a supply system. To prevent cloning, only legitimate tags can be excepted. Therefore, to protect privacy and provide security, some systems provide the ability to authenticate tags. An authentication system usually includes a backend authentication server. However, sometimes an online connection is not readily available, which can add latency to the system. Also, authentication keys need to be securely delivered to all authenticating devices, adding complexity and cost to the system.

Therefore, a need exists for a tag authentication method that solves at least some of the above problems.

BRIEF DESCRIPTION OF THE DRAWINGS

The present invention is illustrated by way of example and is not limited by the accompanying figures, in which like references indicate similar elements. Elements in the figures are illustrated for simplicity and clarity and have not necessarily been drawn to scale.

FIG. 4 illustrates a portion of the supply chain in FIGS. 1-3 in more detail

DETAILED DESCRIPTION

Figure 1:
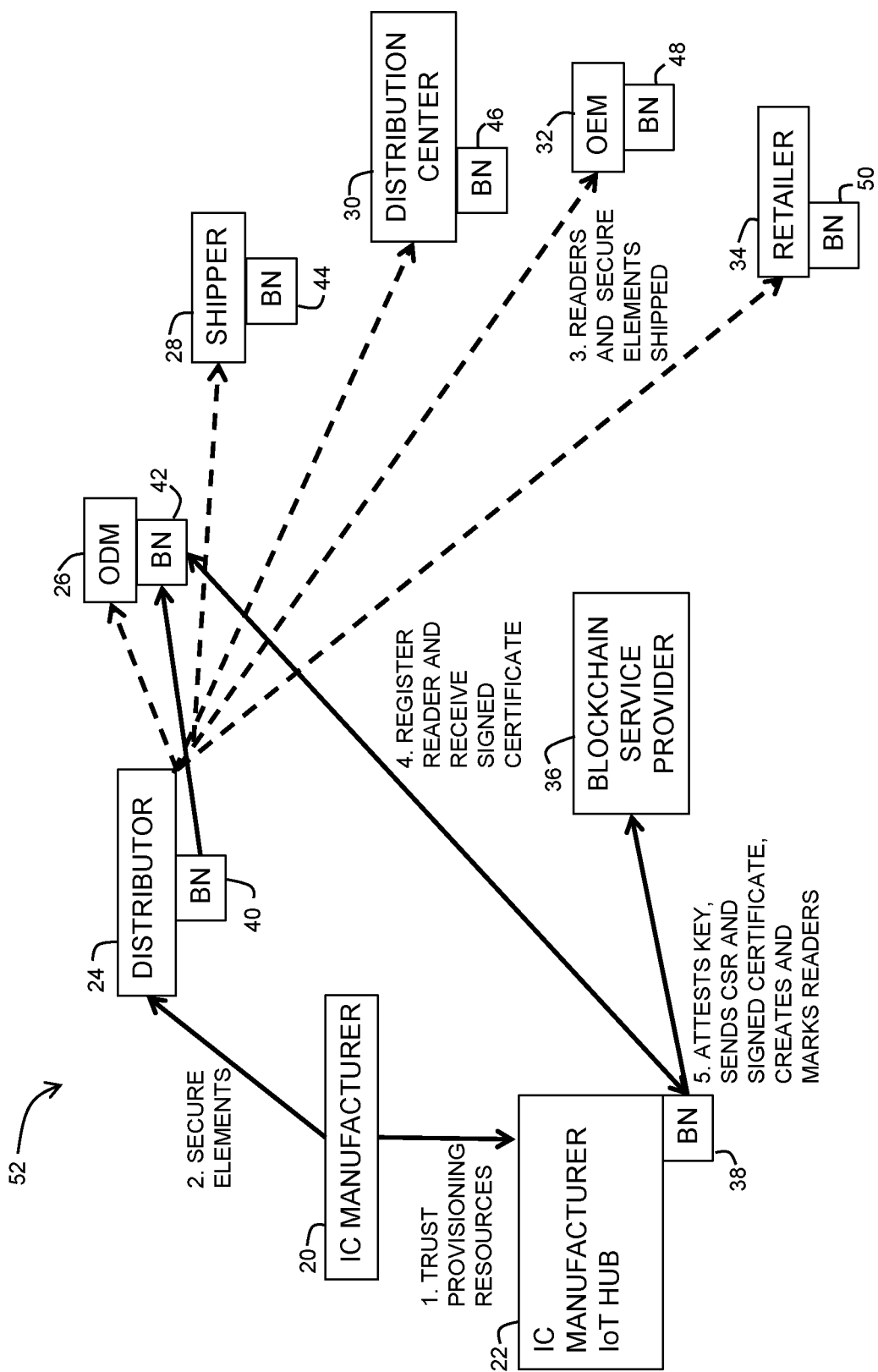
FIG. 1 illustrates a method for registering RFID tag readers in a supply chain in accordance with an embodiment.

Generally, a method is provided for tag authentication in an application such as a supply chain. The supply chain includes various parties in various locations for manufacturing and distributing products. Some of the locations may not be guaranteed a continuous online connection. In the method, tag authentication is performed in a blockchain. Parties in the supply chain may be a party to the blockchain through an assigned blockchain node, and some or all the blockchain nodes includes a tag reader and a secure element. The secure element stores an authentication key. In the method, the tag reader executes a one-side authentication of a tag and records the authentication message in the blockchain. The authentication message is submitted into the blockchain in an attestable manner and can be seen by all the parties to the blockchain. Alternately, the authentication messages can be retrieved only by parties that have a need to retrieve them. The authentication message may include a tag ID, random number, and encrypted random. Submitting the one-side authentication to the blockchain provides proof of the authentication and that the authentication was submitted at a certain point in time. Later, an independent entity in the blockchain that has the authentication key and is required to validate the authentication then takes the previously submitted message and performs a verification of the authentication. The results of the verification or attestation are again submitted to the blockchain. In another embodiment, when an online connection is available the authentication and verification can also be recorded in a database, but it is not necessary.

An advantage of using a blockchain is that it is a distributed database where members can collegially submit entries into the chain and not all the members are trusted. By submitting the verification task into the blockchain and letting an independent entity perform the verification, the independent entity can prove the verification and can attest the submitted authentication and mark it valid in the blockchain. Using a one-side authentication allows separation of the tag authentication from the tag authentication verification. Therefore, the authentication does not have to be performed online with a database or authentication service, which improves latency when an online connection is not available. Also, the authentication keys do not have to be distributed which reduces complexity and need for mutual trust. Also, new parties can be easily added to the authentication. In other embodiments, the tag can be replaced by any device that needs authentication.

In accordance with an embodiment, there is provided, a method for authenticating a device, the method including: executing a one-side authentication of the device; submitting results of the one-side authentication to a blockchain at a first blockchain node of a plurality of blockchain nodes; and verifying the one-side authentication at a second blockchain node of the plurality of blockchain nodes. The method may further include assigning a unique identification (UID) to the device. The device may be a RFID tag. The method may be performed in a supply chain and the device is a RFID tag coupled to a product in the supply chain. Verifying the one-side authentication may be performed online with a database. The device may be a tag and each of the plurality of blockchain nodes includes a tag reader for reading the tag. A tag reader may include a secure element for storing trust provisioned information used for executing the one-side authentication. The trust provisioned information may include a unique identification (UID) corresponding to each of the tag readers, a public key, and a shared secret. Verifying the one-sided authentication may further include attesting the one-side authentication.

In another embodiment, there is provided, a method for authenticating a device in a system having a blockchain and a plurality of parties, wherein each party of the plurality of parties is assigned a blockchain node of the blockchain, the method includes: provisioning a database with trust provisioning information; registering each party of the plurality of parties with the blockchain; registering a plurality of tags for distribution in the system, wherein a tag of the plurality of tags is assigned to the device; enabling a first party of the plurality of parties to perform a one-side authentication of the tag and submit results of the authentication to the blockchain at a first blockchain node; and enabling a second party of the plurality of parties to verify the one-side authentication of the tag from the first party, wherein the verification of the one-side authentication is submitted to the blockchain from a second blockchain node different from the first blockchain node. The blockchain may be characterized as being a private blockchain. The system may be a supply chain system and the first party may be characterized as being a manufacturer of a product, the second party may be downstream the first party in the supply chain system, each of the plurality of parties having a tag reader for reading the plurality of tags, and the device may be one of the plurality of tags. The trust provisioned information may include a unique identification (UID) corresponding to each of the plurality of tags and a shared secret. The tag reader may include a secure element for storing the trust provisioned information. The method may further include verifying integrity of a final product including the device by a third party at a third blockchain node. The plurality of tags may be characterized as being a plurality of radio frequency identification (RFID) tags.

In yet another embodiment, there is provided a method for authenticating a device in a supply chain system having a plurality of parties and a database, wherein each of the plurality of parties is assigned a blockchain node of a blockchain, the method including: provisioning the database with trust provisioning information for a plurality of tags and tag readers; registering each of the plurality of readers in the blockchain; registering the plurality of tags for distribution in the system, wherein a tag of the plurality of tags is assigned to the device; enabling a first party of the plurality of parties to perform a one-side authentication of the tag and submit results of the authentication to the blockchain at a first blockchain node; and enabling a second party of the plurality of parties to verify the one-side authentication of the tag from the first party, wherein the verification of the one-side authentication is submitted to the blockchain and to the database from a second blockchain node different from the first blockchain node. The first party may be characterized as being a manufacturer of a product, the second party may be downstream the first party in the supply chain system, each of the plurality of parties having a tag reader for reading the plurality of tags, and the device may be one of the plurality of tags. The trust provisioned information may include a unique identification (UID) corresponding to each of the plurality of tags and a shared secret. A tag reader may include a secure element for storing the trust provisioned information.

Figure 2:
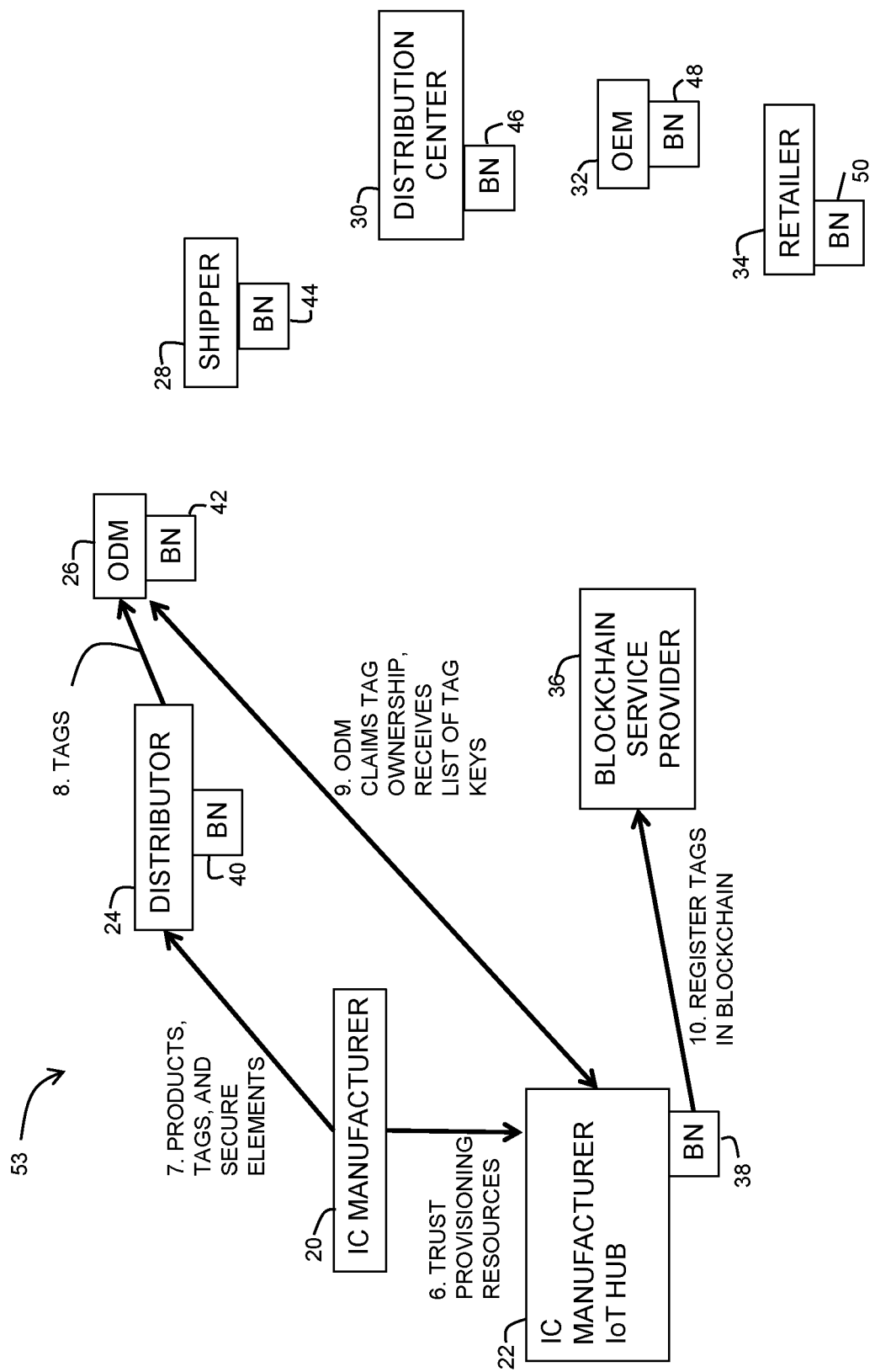
FIG. 2 illustrates a method for registering RFID tags in a supply chain in accordance with an embodiment.
Figure 3:
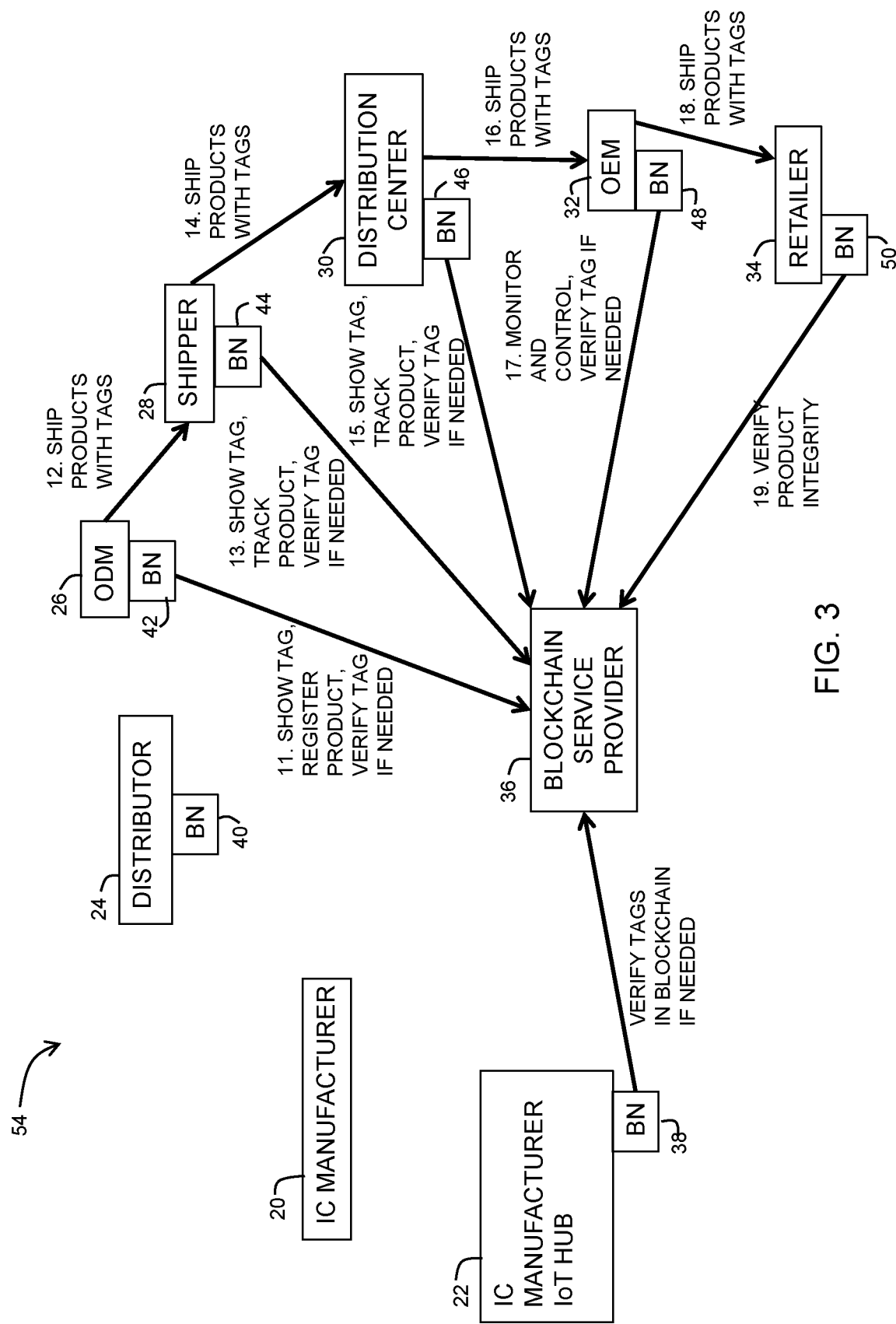
FIG. 3 illustrates a method for tag authentication and verification in accordance with an embodiment.

FIG. 1 illustrates method 52 for registering RFID tag readers in a supply chain application in accordance with one exemplary embodiment. Together, the methods of FIGS. 1-3 comprise one embodiment of a method for authenticating a device. FIG. 1 and FIG. 2 illustrate preliminary steps of registering the tag readers and tags, respectively. FIG. 3 then illustrates execution of the secure manufacturing and delivery of products with tags in accordance with an embodiment. Note, that the described method can be applied to other applications and is not limited to a supply chain. Examples of other applications include asset management, retail, library, and inventory control. Generally, a supply chain includes a plurality of parties. The plurality of parties can be different from one supply chain to the next. The supply chain illustrated herein includes manufacturing and distribution. For example, each of FIG. 1 through FIG. 3 includes an integrated circuit (IC) manufacturer 20, IC manufacturer internet of things (IoT) hub 22, original device manufacturer (ODM) 26, shipper 28, distribution center 30, original equipment manufacturer (OEM) 32, and retailer 34. Note that an IoT device may be any device that can be connected to the internet. More or fewer parties may participate in the supply chain in other embodiments. IC manufacturer IoT hub 22 may be a service provided by IC manufacturer 20 or may be a service provided on behalf of IC manufacturer 20 by a third party that provides provisioning of IoT devices. Each party of the plurality of parties is a participant of a blockchain initiated and/or controlled by a blockchain service provider 36. The illustrated blockchain is characterized as being a private, or permissioned, blockchain where membership in the blockchain is by invitation. Each of the parties may include a blockchain node. For example, IC manufacturer IoT hub 22 includes blockchain node 38, distributor 24 includes blockchain node 40, ODM 26 includes blockchain node 42, shipper 28 includes blockchain node 44, distribution center 30 includes blockchain node 46, OEM 32 includes blockchain node 48, and retailer 34 includes blockchain node 50.

Security of the supply chain is provided by an RFID tag system in combination with the blockchain and secure elements. The tags and readers can use any type of wireless communication protocol such as protocols for Bluetooth, Wi-Fi, RFID, MIFARE, or NFC (near field communication). The RFID tags can authenticate with the readers within the supply chain. Computer systems at various locations in the supply chain have access to a computer network and can submit information to the blockchain via the computer network. All the blockchain transactions are signed using a cryptographic key stored in the secure element. Before the RFID tag system can be used in the blockchain, the readers and the tags in the system are registered. At step 1 in FIG. 1, IC manufacturer 20 provides trust provisioning resources to IC manufacturer IoT hub 22. The trust provisioning resources may include a unique identification (UID) for the tags and readers in the system, a public key, and a shared secret. Note that the described and illustrated embodiment is based on asymmetric cryptography. Other embodiments can use a different type of cryptography. IC manufacturer 20 also stores the trust provisioning resources in secure elements that will be distributed to the other parties of the supply chain. The secure elements may be implemented on tag reader ICs that are also distributed. At step 2, the readers and provisioned secure elements are sent to distributor 24 for distribution. At step 3, distributor 24 ships the secure elements as part of the readers to all the parties of the supply chain, as indicated by the dashed lines in FIG. 1 to ODM 26, shipper 28, distribution center 30, OEM 32, and retailer 34. If additional parties are added to the supply chain later, distributor 24 can ship readers with provisioned secure elements at that time. At step 4, ODM 26 registers the reader it received from distributor 24 with IC manufacturer IoT hub 22. Registering the reader marks it as a participating node in the blockchain. The other parties will do the same, although not illustrated in FIG. 1. In return, IoT hub 22 provides a certificate authority (CA) signed certificate to ODM 26. The CA may be blockchain service provider 36. The signed certificate allows secure online communication between ODM 26 and IoT hub 22. At step 5, IoT hub 22 attests the authentication key to blockchain service provider 36, and sends a certificate signing request (CSR) to blockchain service provider 36. IoT hub 22 also marks the readers that were shipped in step 3 as blockchain nodes. As indicated in FIG. 1 with the dashed lines, readers for blockchain nodes 42, 44, 46, 48, and 50 were delivered in step 3.

FIG. 2 illustrates method 53 for registering RFID tags in the supply chain in accordance with an embodiment. The steps of FIG. 2 continue from step 5 of FIG. 1. At step 6, IC manufacturer 20 sends trust provisioning data to IC manufacturer IoT hub 22 for the tags. Note that the services provided by IC manufacturer IoT hub 22 may differ between the tags and secure elements of the readers. In addition, the services provided by IoT hub 22 for the readers may be provided by different service providers than the service providers for the tags. Also, the readers and tags themselves may be provided by different providers. The trust provisioning resources for the tags may include a UID for each tag, a public key, and a shared secret. At step 7, products from IC manufacturer 20 are provided to distributor 24. Each of the products has a corresponding tag. A secure element is also included and may be implemented on the tag. Alternately, if a distributor is not involved in the supply chain, the products, tags, and secure elements may be sent directly to ODM 26, and step 7 would apply to ODM 26. At step 8, the tags correspond to the products that distributor 24 received from IC manufacturer 20. The tags and products are sent to ODM 26 for use in manufacturing devices that include the products. For each product, ODM 26 reads out the UIDs from the secure memory of the tag. The secure memory may be part of a tag and will be discussed later in connection with FIG. 4. At step 9, ODM 26 claims ownership of a tag and provides blockchain information to blockchain service provider 36. A list of tag authentication keys is made available to ODM 26 if desired. At step 10, blockchain node 38 is used by IC manufacturer IoT hub 22 to register the tags from step 8 as valid tags in the blockchain.

FIG. 3 illustrates method 54 for tag authentication and verification in accordance with an embodiment. Method 54 starts at step 11 and continues from step 10 of FIG. 2. At step 11, ODM 26 performs a one-side authentication of a tag by showing the tag to the blockchain as a one-way message for recording in the blockchain. The reader is connected to the blockchain through a computer. If desired, ODM 26 can request tag verification. Tag verification uses an online connection to blockchain service provider 36. If an online connection is not available, online verification can be delayed without adding latency to the supply chain. At step 12, ODM 26 manufactures products and provides the products with their corresponding tags to shipper 28. At step 13, shipper 28 shows tags for shipped products to the readers that connect to blockchain node 44 and can use the blockchain to track the products. If necessary, shipper 28 can request tag verification. In the illustrated embodiment, shipper 28 ships products to distribution center 30 at step 14. In other embodiments, the supply chain may not include a distribution center. At step 15, distribution center 30 shows tags for the received products to readers that connect to the blockchain via blockchain node 46. If necessary, distribution center 30 can request tag verification. At step 16, products with tags are shipped from distribution center 30 to OEM 32. At step 17, OEM 32 uses blockchain node 48 to monitor and control the product manufacturing and distribution in the supply chain. OEM 32 can request tag verification if needed. At step 18, OEM 32 ships the products with tags to retailer 34 for sales to consumers. At step 19, retailer 34 requests verification, via blockchain node 50, of the one-way authentication message previously submitted to the blockchain at step 11 by ODM 26. Tag verification is performed by querying the blockchain that any legitimate participant to the blockchain can verify.

At any point in the supply chain, a party can request verification of the one-side authentication message submitted to the blockchain. The verification, when performed, is performed by a separate independent entity at a later time and different location than when the one-side authentication message was sent. Note that IC manufacturer IoT hub 22 can verify the tag in the blockchain at any time if needed, and therefore the verification step was not annotated with a step number. Using the blockchain provides a continuous record of the location and status of the tags, so that untrusted but registered members of the blockchain can prove that an authentication was performed. Also, the authentication does not have to be online, which reduces latency when an online connection is not available. In addition, the authentication keys are distributed in a secure memory with the tags, and do not have to be separately distributed, thus reducing complexity and the need for mutual trust.

FIG. 4 illustrates a portion of the supply chain in FIGS. 1-3 in more detail. Blockchain service provider 36 and blockchain node 42 communicate with each other online via internet 60. Blockchain node 42 includes secure element 64, MCU (microcontroller unit) 66, and tag reader IC 68. In one embodiment, only some of the readers of the blockchain nodes may include secure elements. For example, in a party's facility that includes a plurality of readers, only the computer connected on one side to the readers and on the other side connected to the internet for communication with the blockchain needs a secure element for authentication and verification. The secure element includes information that is used to sign transaction requests to the blockchain. Those transaction requests contain all the messages sent by all the readers when they have challenged the tags that they read. Secure element 64 may include a secure memory for storing security related data such as an authentication key, and a processor for running security applications and for providing the protection to the secure memory. Reader IC 68 allows blockchain node 42 to communication bidirectionally and wirelessly 76 with tag 70. Tag 70 includes secure element 72 and tag IC 74. Secure element 72 may be similar to secure element 64 and include a secure memory and a processor. However, because of cost restrictions, the resources of tag 70 may be limited and secure element 72 may only include a small amount of secure memory and very little if any processing power. The disclosed embodiment describes authentication and verification of a tag; however, the described method can be used in other embodiments for authentication and verification of other asset tracking devices.

There may be secure readers at some locations and unsecure readers at other locations. Unsecure readers only perform one-side authentication by submitting an authentication message to the blockchain. To access the blockchain, the unsecure readers may have to prove their identity unless the unsecured reader only sends messages to be recorded and time stamped in the blockchain. Secure readers (that have a secure element) perform verification, in addition to submitting one-side authentication messages, to the blockchain.

Various embodiments, or portions of the embodiments, may be implemented in hardware or as instructions on a non-transitory machine-readable storage medium including any mechanism for storing information in a form readable by a machine, such as a personal computer, laptop computer, file server, smart phone, or other computing device. The non-transitory machine-readable storage medium may include volatile and non-volatile memories such as read only memory (ROM), random access memory (RAM), magnetic disk storage media, optical storage medium, NVM, and the like. The non-transitory machine-readable storage medium excludes transitory signals.

Although the invention is described herein with reference to specific embodiments, various modifications and changes can be made without departing from the scope of the present invention as set forth in the claims below. Accordingly, the specification and figures are to be regarded in an illustrative rather than a restrictive sense, and all such modifications are intended to be included within the scope of the present invention. Any benefits, advantages, or solutions to problems that are described herein with regard to specific embodiments are not intended to be construed as a critical, required, or essential feature or element of any or all the claims.

Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles.

Unless stated otherwise, terms such as "first" and "second" are used to arbitrarily distinguish between the elements such terms describe. Thus, these terms are not necessarily intended to indicate temporal or other prioritization of such elements.

What is claimed is:

1. A method for authenticating a device, the method comprising:
   executing a one-side authentication of the device by a reader;
   submitting results of the one-side authentication to a blockchain, by the reader, at a first blockchain node of a plurality of blockchain nodes; and
   verifying the one-side authentication, by another entity different from the reader, at a second blockchain node of the plurality of blockchain nodes.

2. The method of claim 1, further comprising assigning a unique identification (UID) to the device by a manufacturer of the device.

3. The method of claim 1, wherein the device is a RFID tag.

4. The method of claim 1, wherein the method is performed in a supply chain and the device is a RFID tag coupled to a product in the supply chain.

5. The method of claim 1, wherein verifying the one-side authentication is performed online with a database.

6. The method of claim 1, wherein the device is a tag and each of the plurality of blockchain nodes includes a tag reader for reading the tag.

7. The method of claim 6, wherein a tag reader comprises a secure element for storing trust provisioned information used for executing the one-side authentication.

8. The method of claim 7, wherein the trust provisioned information comprises a unique identification (UID) corresponding to each of the tag readers, a public key, and a shared secret.

9. The method of claim 7, wherein verifying the one-sided authentication further comprises attesting the one-side authentication.

10. In a system having a blockchain and a plurality of parties, wherein each party of the plurality of parties is assigned a blockchain node of the blockchain, a method for authenticating a device comprising:
    provisioning a database with trust provisioning information;
    registering each party of the plurality of parties with the blockchain;
    registering a plurality of tags for distribution in the system, wherein a tag of the plurality of tags is assigned to the device;
    enabling a reader of a first party of the plurality of parties to perform a one-side authentication of the tag and submit results of the authentication to the blockchain at a first blockchain node; and
    enabling a reader of a second party of the plurality of parties to verify the one-side authentication of the tag from the first party, wherein the verification of the one-side authentication is submitted to the blockchain from a second blockchain node different from the first blockchain node.

11. The method of claim 10, wherein the blockchain is characterized as being a private blockchain.

12. The method of claim 10, wherein the system is a supply chain system and the first party is characterized as being a manufacturer of a product, the second party is downstream the first party in the supply chain system, each of the plurality of parties having a tag reader for reading the plurality of tags, and the device is one of the plurality of tags.

13. The method of claim 12, wherein the trust provisioned information comprises a unique identification (UID) corresponding to each of the plurality of tags and a shared secret.

14. The method of claim 12, wherein a tag reader includes a secure element for storing the trust provisioned information.

15. The method of claim 12, further comprising verifying integrity of a final product comprising the device by a third party at a third blockchain node.

16. The method of claim 12, wherein the plurality of tags is characterized as being a plurality of radio frequency identification (RFID) tags.

17. In a supply chain system having a plurality of parties and a database, wherein each of the plurality of parties is assigned a blockchain node of a blockchain, a method for authenticating a device comprising:
    provisioning the database with trust provisioning information for a plurality of tags and tag readers;
    registering each of the plurality of readers in the blockchain;
    registering the plurality of tags for distribution in the system, wherein a tag of the plurality of tags is assigned to the device;
    enabling a reader of a first party of the plurality of parties to perform a one-side authentication of the tag and submit results of the authentication to the blockchain at a first blockchain node; and
    enabling a reader of a second party of the plurality of parties to verify the one-side authentication of the tag from the first party, wherein the verification of the one-side authentication is submitted to the blockchain and to the database from a second blockchain node different from the first blockchain node.

18. The method of claim 17, wherein the first party is characterized as being a manufacturer of a product, the second party is downstream the first party in the supply chain system, each of the plurality of parties having a tag reader for reading the plurality of tags, and the device is one of the plurality of tags.

19. The method of claim 17, wherein the trust provisioned information comprises a unique identification (UID) corresponding to each of the plurality of tags and a shared secret.

20. The method of claim 17, wherein a tag reader includes a secure element for storing the trust provisioned information.

* * * * *